J. D. WILSON.
Animal-Hopple.
No. 160,134. Patented Feb. 23, 1875.
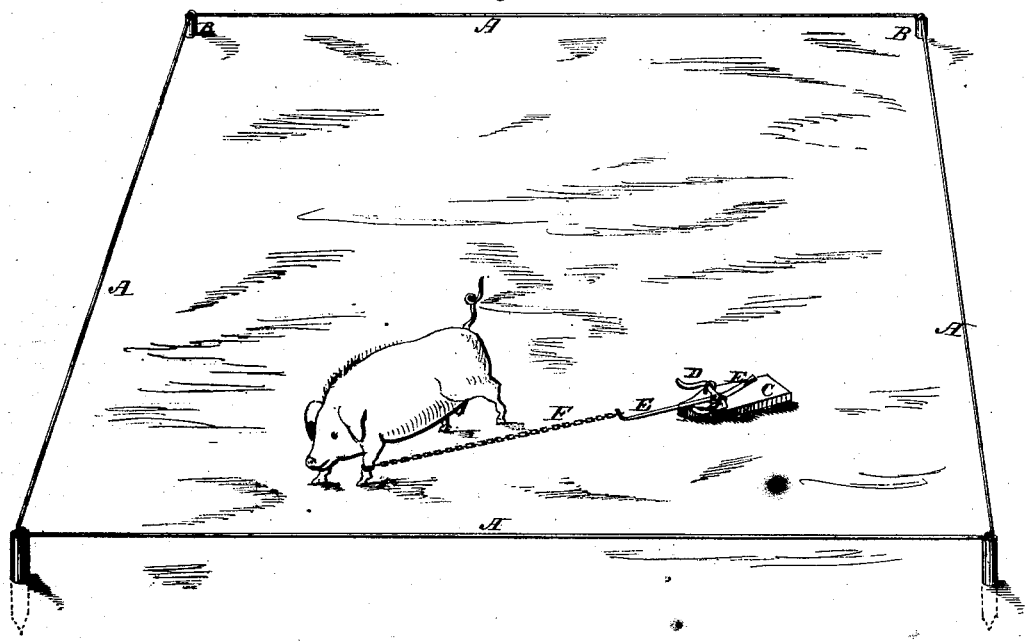
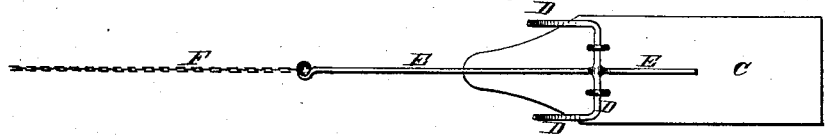
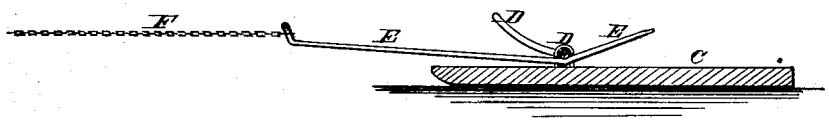
WITNESSES:
INVENTOR:
J. D. Wilson
BY
ATTORNEYS.

UNITED STATES PATENT OFFICE.

JOHN D. WILSON, OF ROUND GROVE, KANSAS.

IMPROVEMENT IN ANIMAL-HOPPLES.

Specification forming part of Letters Patent No. 160,134, dated February 23, 1875; application filed June 27, 1874.

*To all whom it may concern:*

Be it known that I, JOHN D. WILSON, of Round Grove, in the county of Washington and State of Kansas, have invented a new and useful Improvement in Fence and Hopple, of which the following is a specification:

Figure 1 is a perspective view of my improved device, illustrating its use. Fig. 2 is a top view of my improved hopple. Fig. 3 is a longitudinal section of the same.

Similar letters of reference indicate corresponding parts.

My invention has for its object to furnish an improved device for securing hogs, cattle, and other animals within certain limits, while allowing them to feed freely within said limits, and which shall be simple in construction, inexpensive in manufacture, and effective in use, confining the animals safely, and without any danger of injuring them.

The invention consists in the hopple constructed as hereinafter fully described, to adapt it to be used in connection with a wire attached to short stakes, as and for the purpose set forth.

A is a wire, surrounding the space within which it is desired to have the animal confined, and which is passed through staples driven into the tops of stakes B, driven into the ground at suitable distances apart, or is otherwise secured to said stakes. The stakes B are driven firmly into the ground, and their upper ends project about six inches above the ground. C is a plank of suitable length, breadth, and thickness, reference being had to the animal with which it is to be connected. The forward end of the plank C may be rounded off, and should be beveled upon its lower edge, so that it may slide readily over the ground. To the plank C, near its forward end, is secured a cross-bar, D, by means of staples, eyebolts, or other convenient means. The end parts of the bar D are bent forward and curved upward, as shown in Figs. 1, 2, and 3. To the center of the bar D is rigidly attached a bar, E, the end parts of which are inclined upward, and the forward part of which is made longer than the other, and to its end is attached a chain, rope, or strap, F, the free end of which is designed to be attached to the fore-leg of the animal to be hoppled.

With this construction, should the animal pass over the wire A, the device C D E will catch upon the wire A, and thus stop him. After a few attempts the animal will not pass over the wire, but will remain quietly within its limits.

Having thus described my invention, I claim as new, and desire to secure by Letters Patent—

A hopple for animals, consisting of the slide-piece C, cross-bar D, with forwardly-bent ends, rod E, having upwardly-inclined ends, and the flexible connection F, as and for the purpose specified.

JOHN D. WILSON.

Witnesses:
CHAS. F. PECK,
W. W. SMITH.